Patented July 4, 1939

2,164,782

UNITED STATES PATENT OFFICE 2,164,782

SULPHURIC ACID ESTER SALTS OF LEUCO VAT DYESTUFFS

Milton A. Prahl, Milwaukee, and William L. Rintelman, Carrollville, Wis., assignors to E. I. du Pont de Nemours & Company, Wilmington, Del., a corporation of Delaware No Drawing. Application August 23, 1937, Serial No. 160,474

2 Claims. (Cl. 260—276)

This invention relates to the preparation of new and valuable sulphuric acid salts of leuco vat dyestuffs of the anthraquinone series and more particularly to the preparation of a new water soluble derivative of leuco 2,1(N),7,8(N)-anthraquinone dibenzacridone which has been found to be especially suitable for application to textile fibers.

While a number of the anthraquinone benzacridone compounds have been found to be valuable dyes when applied to cellulose fibers by the ordinary vatting procedure, the 2,1(N),7,8(N)-anthraquinone dibenzacridone has always been considered to be of no value whatsoever in the dyeing or printing of fibers. As a vat dyestuff it has practically no affinity for the fiber and after oxidation that small amount which has been absorbed by the fiber is readily washed off.

It is an object of this invention to provide a stable leuco suphuric acid ester salt of an anthraquinone compound which will dye in desirable reddish blue shades and exhibit good fastness properties. We have found that this compound which has heretofore been thought to be valueless can be converted to a product which may be applied to fibers by the methods usually employed for dyeing leuco sulphuric acid esters to give bright reddish blue shades of good strength and of excellent fastness to washing and bleaching. It has also been found that this new leuco sulphuric acid ester differs from the leuco sulphuric acid esters of many of the other anthraquinone ancridone compounds in that it is entirely stable and is not subject to the chemical changes which often occur with the other anthraquinone acridone leuco sulphuric acid esters on storage.

The known processes heretofore used in the preparation of sulphuric acid esters of anthraquinone vat dyestuffs may be employed in the preparation of this new compound.

The following example is given to illustrate a specific process for preparing this new dyestuff. The parts used are by weight.

Example 26 parts of 65% oleum are slowly added to 150 parts of dry pyridine, with thorough agitation, at a temperature of about 40 to 50° C. 20 parts of finely pulverized 2,1(N),7,8(N)-anthraquinone dibenzacridone are then added. 20 parts of copper powder are slowly added during 45 minutes at 60 to 65° C. The mass is then stirred for a further period of 2 hours at the same temperature. The resulting red mass is then run into 2000 parts of water and ice in which 40 parts of sodium carbonate have been dissolved. After thorough stirring the crystalline or in some cases viscous copper complex which separates is removed by filtration or decantation of the supernatant liquid. The solid is slurred in a solution of 10 parts of the caustic soda dissolved in 150 parts of water until it decomposes with liberation of copper oxide. The copper oxide and any other solids present are filtered off and the pyridine in the filtrate is removed by distillation under reduced pressure. The red liquid containing the sodium salt of the leuco sulphuric acid ester of 2,1(N),7,8(N)-anthraquinone dibenzacridone may be distilled further until it becomes a paste, which may then be stored, or the ester salt may be salted out as the potassium salt with potassium chloride.

The product is a red paste, very readily soluble in water. It dyes cotton by the usual padding process in red shades, which are regenerated to the reddish blue shade of the original acridone upon treatment with oxidizing agents in the presence of acids.

When used in printing formulas such as are generally used in printing ester salts of leuco vat colors, rich bright reddish blue shades are obtained.

Caustic potash, triethanolamine, or other strong alkalis may be substituted for the caustic soda to prepare the corresponding salts of the leuco sulphuric acid ester.

We claim:

1. The water soluble leuco sulphuric acid ester salt of 2,1(N),7,8(N)-anthraquinone dibenzacridone which dyes cellulose fibers in red shades which are converted by oxidizing agents in the presence of an acid to rich bright reddish blue shades.

2. Fiber colored by developing thereon a color comprising a leuco sulphuric acid ester salt of 2,1(N),7,8(N)-anthraquinone dibenzacridone.

MILTON A. PRAHL.
WILLIAM L. RINTELMAN.